Patented Mar. 10, 1953

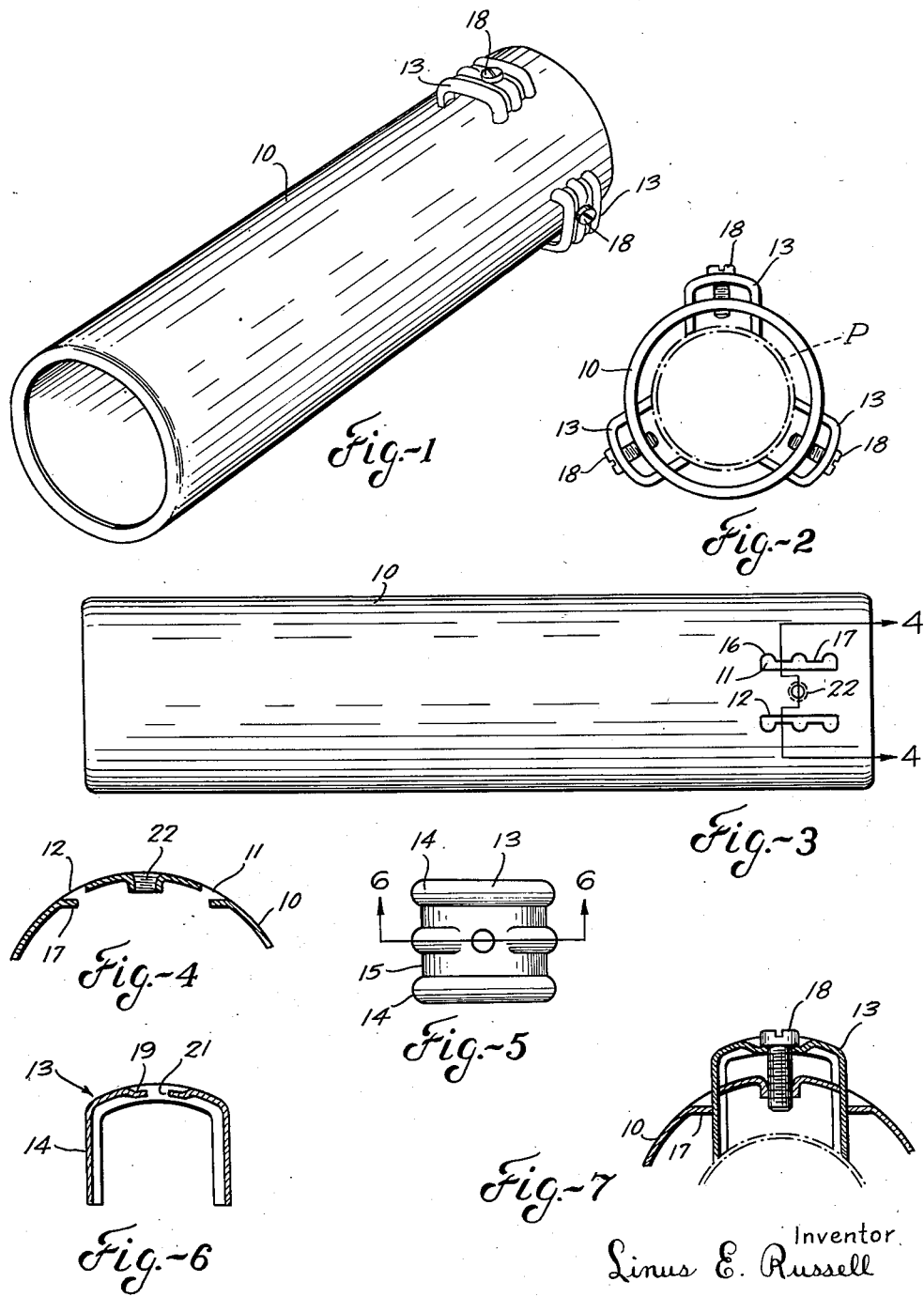

2,630,835

UNITED STATES PATENT OFFICE 2,630,835

CLAMP MEANS

Linus E. Russell, Springfield, Ohio, assignor to Peters & Russell, Inc., Springfield, Ohio, a corporation of Ohio Application July 24, 1950, Serial No. 175,527

7 Claims. (Cl. 138—46.5)

This invention relates to clamping devices, having particular although not limited reference to clamp arrangements for attaching a deflector extension member upon an exhaust tail pipe.

An object of the invention is to provide simple and effective clamping means of especial utility in connection with tube type extensions.

Another object of the invention is to utilize cooperating radial clamps to hold the deflector in concentric spaced relation to the exhaust pipe.

A further object of the invention is to provide a bearing for said clamps exceeding in length the thickness of the material of the deflector.

Still another object of the invention is to construct the deflector and clamps of light weight, deformable metal, the deflector and clamps having complementary shapes to effect a strong unyielding connection and to provide the aforesaid bearing.

A further object of the invention is to provide a clamping means having the advantageous structural features, the meritorious characteristics and the mode of assembly herein set forth.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the drawing, wherein is shown the preferred but obviously not necessarily the only form of embodiment of the invention, Fig. 1 is a perspective view of a tubular type deflector in accordance with the instant invention;

Fig. 2 is an end view of the deflector of Fig. 1;

Fig. 3 is a top plan view of the deflector, with the clamps removed;

Fig. 4 is a view in cross section taken substantially along the line 4—4 of Fig. 3;

Fig. 5 is a detail top plan view of a clamp;

Fig. 6 is a view in cross section taken substantially along the line 6—6 of Fig. 5; and Fig. 7 is a detail view in cross section, showing a clamp installed in the deflector.

Like parts are indicated by similar characters of reference throughout the several views.

Referring to the drawings, an extension member in accordance with the instant invention comprises a piece of cylindrical tubing 10 made of a light weight deformable metal. As shown in Fig. 3, there is formed in the tubing 10, adjacent to one end thereof, a series of radial slots arranged in circumferentially spaced apart pairs of opposed slots 11 and 12.

The pairs of slots 11 and 12 are provided to receive the legs of U-shaped clamps 13. The clamps 13 are broad and flat except for transverse beads 14 defining grooves 15. The slots 11 and 12 are complementary in shape to the legs of the clamps 13, being formed with recessed areas 16 receiving the beads 14 and intervening tongues 17 substantially interfitting with the grooves 15. As seen in Figs. 4 and 7, however, the tongues 17 are struck inward to occupy a spaced relation to the wall of the tubing and to achieve in conjunction therewith a relatively elongated bearing for the clamp 13. Each leg of the clamp thereby is engaged at vertically spaced points along its length.

As illustrated in Fig. 2, the free inner ends of the clamps 13 are arranged to engage an exhaust pipe or like device P, received in the pipe extension, the several clamps cooperating to secure the pipe extension in concentric unitary relation to the pipe. Radial adjustment of the clamps is effected under the control of adjusting screws 18, the heads of which are received in cup-like depressions 19 in the closed end of the clamps. The shanks of the screws 18 extend through openings 21 in the clamps 13 and through registering openings 22 in the wall of extension tubing 10, there being an opening 22 between each pair of slots 11 and 12. The openings 22 are formed by inward extrusion of the material of the tubing 10 and are internally threaded for complementary engagement with the threads on the shank of screws 18. It will be apparent that by turning the screws 18 inward, the clamps 13 may be drawn up tightly against the pipe P. Similarly, a backing off of the screws 18 will release the clamps from gripping engagement with the pipe P.

From the above description it will be apparent that there is thus provided a device of the character described possessing the particular features of advantages before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. An exhaust pipe extension or the like, including a cylindrical part to receive the exhaust pipe, said part being made of a relatively thin, light weight and deformable metal, a circumferential series of clamps installed in said part near one end thereof, said clamps being generally U-shaped and having the legs thereof passed through said part to engage the exhaust pipe, the closed ends of said clamps lying outside said part, tongues struck out of the circumferential plane of said part providing elongated bearings for the legs of said clamps, and a screw passed through the closed end of each said clamps and extending into threaded engagement with said part.

2. An exhaust pipe extension or the like, including a tubular member to receive through one end thereof the exhaust pipe or like device, said member being made of a relatively thin, light weight and deformable metal, a plurality of clamps extending into said member adjacent said one end to grip the exhaust pipe, and slots in said member for the passage of said clamps therethrough, said slots being formed with tongues struck out of the circumferential plane of said member to define in conjunction with the wall of said member radially spaced bearings for said clamps.

3. An exhaust pipe extension or the like, including a tubular member to receive through one end thereof the exhaust pipe or like device, said member being made of a relatively thin, light weight and deformable metal, a plurality of clamps extending into said member adjacent said one end to grip the exhaust pipe, and tongues struck out inwardly from the wall of said member to define with said wall radially spaced bearings for said clamps.

4. An exhaust pipe extension or the like, including a tubular member to receive through one end thereof the exhaust pipe or like device, a plurality of clamps extending into said member adjacent said one end to grip the exhaust pipe, said clamps presenting longitudinally grooved portions, and slots in said member to receive said clamps, said slots presenting tongues complementary to said grooved portions and struck inward to define a bearing for said clamps of a length exceeding the thickness of the material of said member.

5. An exhaust pipe extension or the like, including a tubular member to receive through one end thereof the exhaust pipe or like device, a circumferential series of U-shaped clamps having the legs thereof projecting into said member to grip the exhaust pipe, said legs being formed with longitudinal beads defining grooves therebetween, slots in said member to receive said clamps, said slots being formed complementary to the shape of said legs and presenting tongues received in said grooves, said tongues being struck inward to lengthen the bearing for said clamps in said member, and adjustment screws extending through the closed end of said clamps into said member, said screws having a threaded engagement with the wall of said member and being adjustable to tighten and loosen the clamps upon the exhaust pipe.

6. An exhaust pipe extension according to claim 5, characterized in that said clamps and said member are provided with registering openings to pass said screws, the openings in said member being formed by extrusion, said member being formed of a light weight deformable metal facilitating the striking in of said tongues and the extruding of said openings.

7. An exhaust pipe extension or the like, including a tubular member to receive an exhaust pipe, said extension exceeding the exhaust pipe in diameter, a plurality of clamps spaced equidistant about said extension and extending into said member to grip the exhaust pipe and hold the extension in concentric spaced relation therewith, said clamps projecting into said member to grip the exhaust pipe and with an end outside the member, adjustment screws extending through said end of said clamps into said member, and slots in said member receiving the clamps, said slots having portions of the edges thereof struck out of the plane of said member into the space between said member and the exhaust pipe to increase the length of bearing contact of said member with said clamps.

LINUS E. RUSSELL.

REFERENCES CITED

The following references are of record in the file of this patent:

UNITED STATES PATENTS

| Number | Name | Date |
|---|---|---|
| 1,685,006 | Schultz | Sept. 18, 1928 |
| 1,904,409 | Church | Apr. 18, 1933 |
| 2,506,398 | Thomas | May 2, 1950 |